US012689506B2

(12) United States Patent
Lindberg Nilsson et al.

(10) Patent No.: US 12,689,506 B2
(45) Date of Patent: Jul. 21, 2026

(54) UPDATING VEHICLE OWNERSHIP AUTHORIZATIONS

(71) Applicants: Ningbo Geely Automobile Research & Development Co., Ltd., Ningbo (CN); Zhejiang Geely Holding Group Co., Ltd., Zhejiang (CN)

(72) Inventors: Erik Lindberg Nilsson, Gothenburg (SE); Anders Bengtsson, Gothenburg (SE)

(73) Assignees: NINGBO GEELY AUTOMOBILE RESEARCH & DEVELOPMENT CO., LTD., Ningbo (CN); ZHEJIANG GEELY HOLDING GROUP CO., LTD., Zhejiang (CN)

( * ) Notice: Subject to any disclaimer, the term of this patent is extended or adjusted under 35 U.S.C. 154(b) by 114 days.

(21) Appl. No.: 18/614,687

(22) Filed: Mar. 24, 2024

(65) Prior Publication Data

US 2024/0259198 A1 Aug. 1, 2024

Related U.S. Application Data

(63) Continuation of application No. PCT/CN2022/120515, filed on Sep. 22, 2022.

(30) Foreign Application Priority Data

Sep. 29, 2021 (EP) ..................................... 21199884

(51) Int. Cl.
*H04L 9/08* (2006.01)
*H04L 9/40* (2022.01)
*H04W 4/02* (2018.01)

(52) U.S. Cl.
CPC ........ *H04L 9/0891* (2013.01); *H04L 63/0861* (2013.01); *H04L 2209/84* (2013.01); *H04W 4/02* (2013.01)

(58) Field of Classification Search
CPC .. H04L 9/0891; H04L 2209/84; H04W 12/08; H04W 4/02
See application file for complete search history.

(56) References Cited

U.S. PATENT DOCUMENTS 10,351,100 B1 * 7/2019 Hentschel ............. B60R 25/243
10,589,719 B1 * 3/2020 Sohn ..................... B60R 25/241
(Continued)

FOREIGN PATENT DOCUMENTS

EP 2743141 A1 6/2014
GB 2402840 A 12/2004

OTHER PUBLICATIONS

International Search Report from corresponding International Application No. PCT/CN2022/120515, mailed on Jan. 23, 2023, 2 pages.

*Primary Examiner* — Ellen Tran
(74) *Attorney, Agent, or Firm* — Tucker Ellis LLP

(57) ABSTRACT

A method of updating vehicle ownership authorizations in a vehicular system and such a system that includes a memory unit and an electronic control unit. The electronic control unit monitors data, provisioned by one or more vehicle sensory systems, related to a vehicle user and to at least one of vehicle access keys, vehicle parking position and further vehicle occupants, evaluates the monitored data, for determining if a vehicle user is unknown and upon determination that the vehicle user is unknown further evaluates the monitored data, for determining an indication of change of vehicle ownership, using data previously registered with the memory unit of the system related to at least one of vehicle access keys, vehicle parking positions, vehicle users and further vehicle occupants. In response to a determined indication of change of vehicle ownership and optional verification thereof, vehicle ownership authorizations are updated in the memory unit.

13 Claims, 2 Drawing Sheets

(56)  References Cited

U.S. PATENT DOCUMENTS

| | | | |
|---|---|---|---|
| 11,748,510 B1* | 9/2023 | Beveridge | G06F 21/6245 |
| | | | 726/27 |
| 2011/0098028 A1 | 4/2011 | Economos | |
| 2014/0156110 A1* | 6/2014 | Ehrman | G07C 5/008 |
| | | | 701/2 |
| 2018/0197027 A1 | 7/2018 | Ali | |
| 2020/0059359 A1 | 2/2020 | Sugano | |
| 2021/0035390 A1* | 2/2021 | Determann | G07C 9/00857 |
| 2021/0105619 A1 | 4/2021 | Kashani | |

* cited by examiner

UPDATING VEHICLE OWNERSHIP AUTHORIZATIONS

RELATED APPLICATION DATA

This application is a continuation of International Patent Application No. PCT/CN2022/120515, filed Sep. 22, 2022, which claims the benefit of European Patent Application No. 21199884.4, filed Sep. 29, 2021, the disclosures of which are incorporated herein by reference in their entireties.

TECHNICAL FIELD

The present invention relates to the field of vehicle ownership authorizations in vehicular systems, and more specifically to updating vehicle ownership authorizations in a vehicular system.

BACKGROUND

When buying a used car on the secondhand market, it is essential that all keys to the vehicle are handed over to the new owner. However, there is usually no way for the new owner to know how many keys there are for the car. This is especially relevant when using so called phone as key solutions, i.e. digital keys that lets car owners e.g. locate, lock, unlock and start a vehicle from their smartphone. As an example, some such digital key solutions can store up to 12 different keys, that can be owner keys, rental keys or keys designated as different service keys.

As this is not always a commonly known functionality by potential vehicle buyers, a dishonest vehicle owner may try to sell a vehicle with the intention to keep a key and then go back to the vehicle to steal it at a later time.

Furthermore, a first owner could potentially try to sell a vehicle to more than one buyer within a short period of time, where the legal ownership is not yet registered properly due to administration times.

Still further, with a phone as key, a user can often have access to see vehicle information, like location and lock status. This makes it easy for a seller with malicious intent to locate the vehicle at an appropriate time to gain access to it as compared to when trying to do the same thing using a traditional key or key fob.

US 2020/0059359 A1 relates to a vehicular system that ensures security by changing an encryption key used in an automobile to a new encryption key when the owner of the automobile has changed, to prevent a previous user from illegally accessing the vehicle. The system receives an owner information input and compares the inputted information with stored owner information. If the inputted information is different from the stored owner information, it indicates that the ownership of the vehicle is changed, and the owner of the vehicle may be notified that security needs to be updated.

However, this solution is focused on changing an encryption key used in an automobile to a new encryption key when the owner of the automobile has changed to prevent a malicious previous owner or a temporary malicious user of an automobile, having obtained an encryption key used for ensuring the integrity of messages and data protection in that vehicle, from illegally accessing messages and data or illegally operating an Electronic Control Unit (ECU) thereof, through the insertion of illegal messages.

SUMMARY

An objective of the present disclosure is to provide a simple and secure solution for updating vehicle ownership authorizations in a vehicular system. This objective is achieved in a first aspect by a method of updating vehicle ownership authorizations in a vehicular system including a memory unit and an electronic control unit that manages vehicle ownership authorizations, the method characterized in that it comprises, by the electronic control unit: monitoring data, provisioned by one or more vehicle sensory systems, related to a vehicle user and to at least one of vehicle access keys, vehicle parking position and further vehicle occupants; evaluating the monitored data, for determining if a vehicle user is unknown and upon determination that the vehicle user is unknown further evaluating the monitored data, for determining an indication of change of vehicle ownership, using data previously registered with the memory unit of the vehicular system related to at least one of vehicle access keys, vehicle parking positions, vehicle users and further vehicle occupants; updating, in response to a determined indication of change of vehicle ownership and optional verification thereof, vehicle ownership authorizations in the memory unit of the vehicular system.

The herein proposed method of updating vehicle ownership authorizations ensure that a previous owner is not allowed to track, open or start the vehicle or access private data in the vehicle following a determined indication of change of vehicle ownership. It also ensures that a new owner is provided with all owner accesses such that this new owner is able to access diverse functions like car sharing. Thereby, a simple and secure solution for updating vehicle ownership authorizations in a vehicular system is provided. The optional verification of a determined indication of change of vehicle ownership ensure that a new vehicle owner is made aware to secure that the previous owner is not able to access the vehicle after the sale.

In one embodiment, the updating of vehicle ownership authorizations as the optional verification thereof further comprises, by the electronic control unit, requesting and receiving, via a user interface associated with the vehicular system, confirmation of change of vehicle ownership as a prerequisite for updating vehicle ownership authorizations. By means of requesting and receiving, via a user interface associated with the vehicular system, confirmation of change of vehicle ownership a new owner made aware that this function exists to take proper actions to secure the vehicle.

In one embodiment, the evaluating of the monitored data comprises evaluating if user accounts, related to the vehicle user, logged in to the vehicular system are previously registered with the memory unit of the vehicular system or not and if determined not previously registered determining a vehicle user as unknown. By means of evaluating user accounts logged in to the vehicular system an unknown vehicle user can be determined.

In one embodiment, the evaluating of the monitored data comprises evaluating if any personal electronic devices or mobile phones, related to the vehicle user, connected to the vehicular system are previously registered with the memory unit of the vehicular system or not and if determined not previously registered determining a vehicle user as unknown. By means of evaluating personal electronic devices or mobile phones connected to the vehicular system an unknown vehicle user can be determined.

In one embodiment, the further evaluating of the monitored data comprises evaluating if all keys previously registered with the memory unit of the vehicular system are determined present in the vehicle for determining an indication of change of vehicle ownership. The evaluation that all keys are determined present in the vehicle provide for ensuring that no unauthorized keys are unaccounted for.

In one embodiment, the monitoring of data related to a vehicle user and to further vehicle occupants comprises monitoring data provisioned by one or more camera-based vehicle sensory systems using facial recognition algorithms for determining if a vehicle user and any further vehicle occupants are previously registered with the memory unit of the vehicular system or not for determining an indication of change of vehicle ownership. The monitoring of data provisioned camera-based vehicle sensory systems and the use of facial recognition algorithms provide for ensuring that previously registered users or vehicle passengers are not unnecessarily classified as new owners and only previously unregistered such as potential new owners.

In one alternative of the previous embodiment, if a vehicle user and all further vehicle occupants are determined not previously registered with the memory unit of the vehicular system determining a vehicle user as unknown and determining an indication of change of vehicle ownership. By means of a determination that a vehicle user and all further vehicle occupants are determined not previously registered is further provided for ensuring that e.g. a frequent vehicle passenger who is temporarily driving is not unnecessarily classified as a new owner.

In another alternative of the previous embodiment, repeated determination of an unknown user over a pre-determined time period in combination with no determination among all vehicle occupants of a vehicle user previously registered with the memory unit of the vehicular system is used for determining an indication of change of vehicle ownership. By means of repeated determination of an unknown user whilst no previous user is determined an increased probability of a correct determining of an indication of change of vehicle ownership is ensured.

In one embodiment, repeated determination of an unknown user over a pre-determined time period in combination with a determination of a vehicle parking position previously not registered with the memory unit of the vehicular system is used for determining an indication of change of vehicle ownership. By means of repeated determination of an unknown user whilst the vehicle is parked at a new location an increased probability of a correct determining of an indication of change of vehicle ownership is ensured.

In a second aspect of the present disclosure, there is provided a vehicular system including a memory unit and an electronic control unit that manages vehicle ownership authorizations comprising a processor and a non-transitory computer-readable storage medium that stores a program configured to execute the method of updating vehicle ownership authorizations according to the first aspect when executed by the processor.

In one embodiment, the system further comprises: one or more interfaces configured to receive, to the electronic control unit, data, provisioned by one or more vehicle sensory systems, related to a vehicle user and to at least one of vehicle access keys, further vehicle occupants and a vehicle parking position; and that the memory unit further is configured to allow storage and retrieval of data related to vehicle ownership authorizations and at least one of vehicle access keys, vehicle users, further vehicle occupants and vehicle parking positions. The provision of interfaces configured to receive data provisioned by different vehicle sensory systems allow for using a plethora of data from available vehicle sensory systems to be used for improving the determinations of the system.

In a third aspect of the present disclosure, there is provided a non-transitory computer-readable storage medium that stores a program configured to execute the method of updating vehicle ownership authorizations according to the first aspect.

In a fourth aspect of the present disclosure, there is provided a computer program product comprising instructions which, when the program is executed by a computer, cause the computer to carry out the method of updating vehicle ownership authorizations according to the first aspect.

In a fifth aspect of the present disclosure, there is provided a vehicle comprising a vehicular system according to the second aspect.

Further features and advantages of the present disclosure will become apparent when studying the appended claims and the following description. The person skilled in the art realizes that different features of the present disclosure may be combined to create embodiments other than those described hereinabove, without departing from the scope of the present disclosure.

BRIEF DESCRIPTION OF THE DRAWINGS

With reference to the appended drawings, below follows a more detailed description of example embodiments of the invention, wherein.

DETAILED DESCRIPTION OF EXAMPLE EMBODIMENTS

Figure 1:
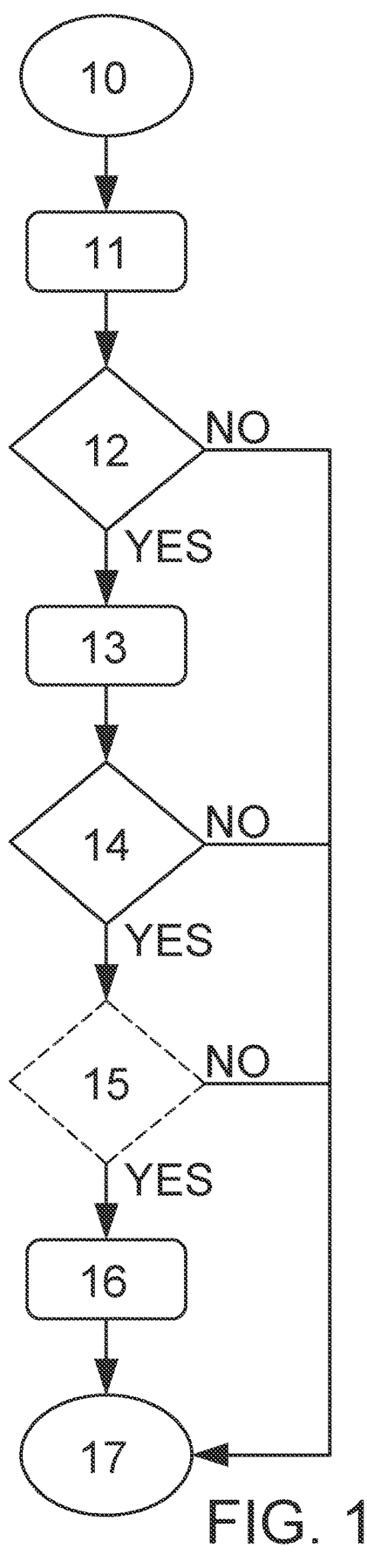
FIG. 1 is a flow chart illustrating the method of updating vehicle ownership authorizations in a vehicular system according to embodiments herein.

In the following, a detailed description of a method of updating vehicle 1 ownership authorizations in a vehicular system 2 and such a vehicular system 2 according to the present disclosure is presented.

The expression "vehicular system" in the present disclosure may include a device mounted on a vehicle in advance, a device retrofitted to a vehicle, and a device that outputs signals to an electronic control device mounted on a vehicle such as a vehicle-outside server and an electronic control device used by a dealer or repair shop.

In the drawing figures, like reference numerals designate identical or corresponding elements throughout the several figures. It will be appreciated that these figures are for illustration only and do not in any way restrict the scope of the present disclosure.

With reference to FIG. 1, there is shown a flow chart illustrating the method of updating vehicle 1 ownership authorizations in a vehicular system 2. The vehicular system 2 includes a memory unit 3 and an electronic control unit (ECU) 4 that manages vehicle 1 ownership authorizations.

According to the method, as the vehicle is started 10, data provisioned by one or more vehicle 1 sensory systems is monitored 11 by the electronic control unit 4. This data is related to a vehicle 1 user and to at least one of vehicle 1 access keys, vehicle 1 parking position and further vehicle 1 occupants.

The vehicle 1 sensory systems that provisions the data may be any one of a variety of commonly available sensory systems such as driver and/or passenger monitoring cameras, remote keyless systems e.g. relying on a short-range radio transmitters/receivers, contactless identifications sensors, such as e.g. based on RFID technology, positioning sensors such as GNSS based sensors, e.g. GPS, GLONASS, Beidou or Galileo based positioning sensors. Note that this list is not exhaustive and that the vehicle 1 sensory systems that provisions the data could be any sensory system present in a vehicle and providing data suitable for use with the herein disclosed method and system.

The monitored data is evaluated 12 by the electronic control unit 4, for determining if a vehicle 1 user is unknown. Upon determination that the vehicle 1 user is previously known the method is terminated 17, whereas upon determination that the vehicle 1 user is unknown the monitored data is further evaluated 13 by the electronic control unit 4, for determining 14 an indication of change of vehicle 1 ownership.

The evaluating 12 of the monitored data may comprise evaluating if user accounts, related to the vehicle 1 user, logged in to the vehicular system 2 are previously registered with the memory unit 3 of the vehicular system 2 or not. If user accounts, related to the vehicle 1 user, logged in to the vehicular system 2 are determined not previously registered the vehicle 1 user is determined as unknown.

The evaluating 12 of the monitored data may further comprise evaluating if any personal electronic devices or mobile phones, related to the vehicle 1 user, connected to the vehicular system 2, e.g. via an entertainment or communication system of the vehicle or equivalent, are previously registered with the memory unit 3 of the vehicular system 2 or not. If any personal electronic devices or mobile phones, related to the vehicle 1 user, connected to the vehicular system 2 are determined not previously registered the vehicle 1 user is determined as unknown.

The further evaluation 13 is performed by the electronic control unit 4 using data previously registered with the memory unit 3 of the vehicular system 2. This data is related to at least one of vehicle 1 access keys, vehicle 1 parking positions, vehicle 1 users and further vehicle 1 occupants.

The further evaluating 13 of the monitored data may comprise evaluating if all keys previously registered with the memory unit 3 of the vehicular system 2 are determined present in the vehicle 1 for determining an indication of change of vehicle 1 ownership.

The monitoring 11 of data related to a vehicle 1 user and to further vehicle 1 occupants may comprise monitoring data provisioned by one or more camera-based vehicle sensory systems (not shown) using facial recognition algorithms for determining if a vehicle 1 user and any further vehicle 1 occupants are previously registered with the memory unit 3 of the vehicular system 2 or not. This information is used for determining an indication of change of vehicle 1 ownership.

In some instances, if a vehicle 1 user and all further vehicle 1 occupants are determined not previously registered with the memory unit 3 of the vehicular system 2 a vehicle 1 user is determined as unknown and an indication of change of vehicle 1 ownership determined.

In other instances, repeated determination of an unknown user over a pre-determined time period in combination with no determination among all vehicle 1 occupants of a vehicle 1 user previously registered with the memory unit 3 of the vehicular system 2 is used for determining an indication of change of vehicle 1 ownership.

In some instances, repeated determination of an unknown user over a pre-determined time period in combination with a determination of a vehicle 1 parking position previously not registered with the memory unit 3 of the vehicular system 2 is used for determining an indication of change of vehicle 1 ownership.

If no indication of change of vehicle 1 ownership is determined 14 the method is terminated 17, whereas upon determining 14 an indication of change of vehicle 1 ownership the method concludes in updating 16 of vehicle 1 ownership authorizations in the memory unit 3 of the vehicular system 4, whereupon the method is terminated 17. Optionally, this updating 16 is performed in response to a determined indication of change of vehicle 1 ownership and positive verification 15 thereof, whereupon the method is terminated 17. Upon a negative verification 15 the method is terminated 17 without this updating 16.

The optional verification 15 can be made through requesting and receiving, via a user interface (not shown) associated with the vehicular system 2, confirmation 15 of change of vehicle 1 ownership as a prerequisite for updating 16 vehicle ownership authorizations, all under control of the electronic control unit 4. Any suitable in-vehicle user interface, e.g. such as for controlling a multimedia entertainment system, a navigation system or other vehicle functions or systems may be utilized for the optional verification 15 described above.

Figure 2:
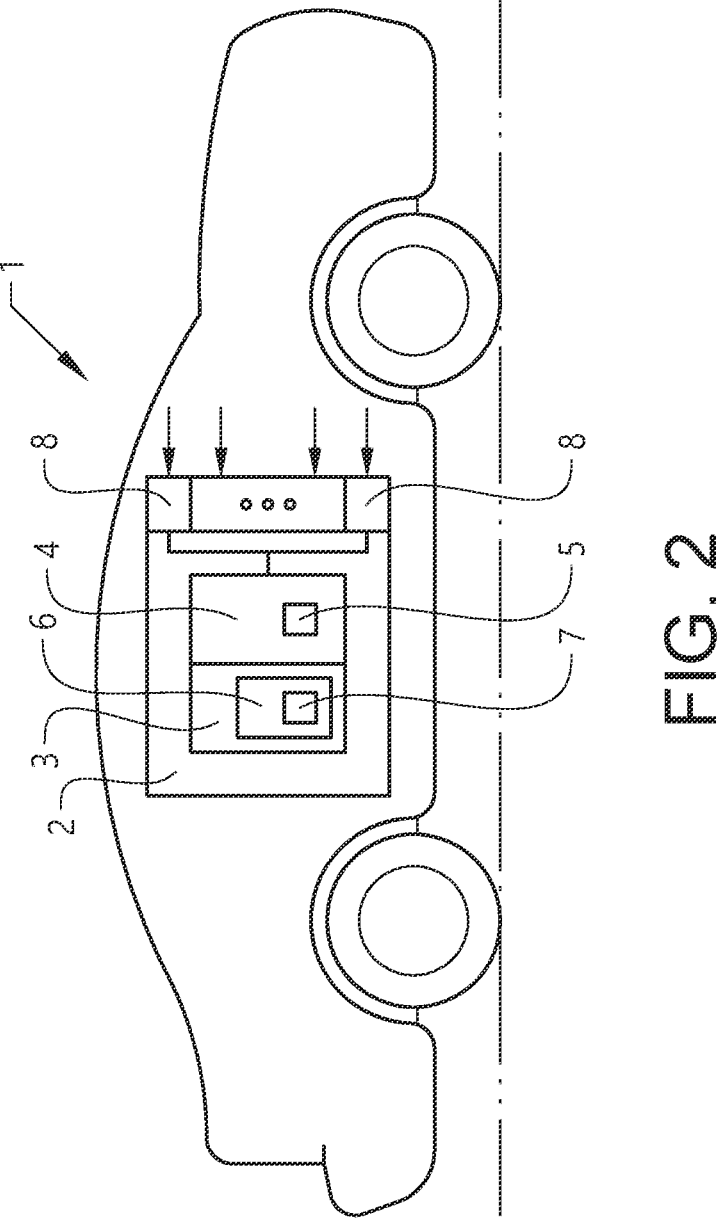
FIG. 2 is a schematic illustration of a vehicle comprising a vehicular system that manages vehicle ownership authorizations according to embodiments herein.

Referring now to FIG. 2, showing a schematic illustration of a vehicle 1 comprising a vehicular system 2 that manages vehicle ownership authorizations according to the above-described method.

The vehicular system 2 includes a memory unit 3 and an electronic control unit (ECU) 4. The ECU 4 is configured to manage vehicle 1 ownership authorizations and comprises a processor 5 and a non-transitory computer-readable storage medium 6, here shown as part of the memory unit 3. The non-transitory computer-readable storage medium 6 stores a program configured to execute the previously described method of updating vehicle 1 ownership authorizations when executed by the processor 5.

One or more interfaces 8 are configured to receive, to the ECU 4, data provisioned by the one or more vehicle sensory systems, as elaborated above, and as illustrated by the arrows connecting to the interface 8 boxes of FIG. 2. As indicated in this figure, any suitable number of such interfaces 8 may be provided and configured to receive different data to the ECU 4. This data to be received is suitably related to a vehicle 1 user and to at least one of vehicle 1 access keys, further vehicle 1 occupants and a vehicle 1 parking position. The memory unit 3 is further configured to allow storage and retrieval of data related to vehicle 1 ownership authorizations and at least one of vehicle 1 access keys, vehicle 1 users, further vehicle 1 occupants and vehicle 1 parking positions.

The non-transitory computer-readable storage medium 6, that stores a program configured to execute the method of updating vehicle ownership authorizations, is suitably a non-volatile memory, i.e. a memory that retains stored data after power is turned off, such as an electrically erasable programmable read-only memory (EEPROM), a flash Read-only Memory (ROM), a hard disk drive (HDD), solid state drive (SSD), an optical storage media or similar.

The program configured to execute the method of updating vehicle 1 ownership authorizations is suitably a computer program product comprising instructions which, when the program is executed by a computer, such as the processor 5, will cause the computer to carry out the previously described method of updating vehicle 1 ownership authorizations.

Although the invention has been illustrated and described in detail in the drawings and foregoing description, such illustration and description are to be considered illustrative or exemplary and the invention is not limited to the disclosed embodiments. For example, the non-transitory computer-readable storage medium 6 may, where a vehicle is connected, i.e. has a wireless connection to a computer network, such as the internet, alternatively be located remote from the vehicle, e.g. in a remote server or so-called cloud-service, and accessed via the wireless connection.

What is claimed is:

1. A method of updating vehicle ownership authorizations in a vehicular system including a memory unit and an electronic control unit that manages vehicle ownership authorizations, the method comprises, by the electronic control unit:

monitoring data, provisioned by one or more vehicle sensory systems, related to a vehicle user and to at least one of vehicle access keys, vehicle parking position, and further vehicle occupants;

evaluating the monitored data for determining if the vehicle user is unknown and, upon determination that the vehicle user is unknown, further evaluating the monitored data for determining an indication of change of vehicle ownership, the further evaluating using data previously registered with the memory unit of the vehicular system related to at least one of vehicle access keys, vehicle parking positions, vehicle users, and further vehicle occupants, and the further evaluating determining if all vehicle access keys previously registered with the memory unit of the vehicular system are present in the vehicle for making the determination of the indication of change of vehicle ownership;

updating, in response to a determined indication of change of vehicle ownership, vehicle ownership authorizations in the memory unit of the vehicular system.

2. The method of updating vehicle ownership authorizations according to claim 1, further comprising, as verification of the updating of vehicle ownership authorizations by the electronic control unit, requesting and receiving, via a user interface associated with the vehicular system, confirmation of change of vehicle ownership as a prerequisite for updating vehicle ownership authorizations.

3. The method of updating vehicle ownership authorizations according to claim 1, wherein the evaluating of the monitored data comprises evaluating if user accounts related to the vehicle user and logged in the vehicular system are previously registered with the memory unit of the vehicular system or not and, if determined not previously registered, determining the vehicle user as unknown.

4. The method of updating vehicle ownership authorizations according to claim 1, wherein the evaluating of the monitored data comprises evaluating if any personal electronic devices or mobile phones, related to the vehicle user and connected to the vehicular system are previously registered with the memory unit of the vehicular system or not and, if determined not previously registered, determining the vehicle user as unknown.

5. The method of updating vehicle ownership authorizations according to claim 1, wherein the monitoring of data related to the vehicle user and to further vehicle occupants comprises monitoring data provisioned by one or more camera-based vehicle sensory systems using facial recognition algorithms for determining if the vehicle user and any further vehicle occupants are previously registered with the memory unit of the vehicular system or not for determining an indication of change of vehicle ownership.

6. The method of updating vehicle ownership authorizations according to claim 5, wherein, if the vehicle user and all further vehicle occupants are determined not previously registered with the memory unit of the vehicular system determining the vehicle user as unknown and determining an indication of change of vehicle ownership.

7. The method of updating vehicle ownership authorizations according to claim 5, wherein repeated determination of an unknown user over a pre-determined time period in combination with a determination that no vehicle occupants are previously registered with the memory unit of the vehicular system is used for determining an indication of change of vehicle ownership.

8. The method of updating vehicle ownership authorizations according to claim 1, wherein repeated determination of an unknown user over a pre-determined time period in combination with a determination of a vehicle parking position previously not registered with the memory unit of the vehicular system is used for determining an indication of change of vehicle ownership.

9. A vehicular system comprising a processor and a non-transitory computer-readable storage medium that stores a program configured to execute the method of updating vehicle ownership authorizations according to claim 1 when executed by the processor.

10. The vehicular system according to claim 9, wherein the system further comprises:

one or more interfaces configured to receive, to the electronic control unit, data, provisioned by one or more vehicle sensory systems, related to the vehicle user and to at least one of vehicle access keys, further vehicle occupants, and a vehicle parking position; and that the memory unit further is configured to allow storage and retrieval of data related to vehicle ownership authorizations and at least one of vehicle access keys, vehicle users, further vehicle occupants, and vehicle parking positions.

11. A non-transitory computer-readable storage medium that stores a program configured to execute the method of updating vehicle ownership authorizations according to claim 1.

12. A vehicle comprising a vehicular system according to claim 9.

13. The method of updating vehicle ownership authorizations according to claim 1, wherein the method further comprises verifying the indication of change of vehicle ownership.

* * * * *